(12) United States Patent
Uchida et al.

(10) Patent No.: US 11,927,505 B2
(45) Date of Patent: Mar. 12, 2024

(54) AERODYNAMIC CHARACTERISTIC ESTIMATION DEVICE, AERODYNAMIC CHARACTERISTIC ESTIMATION METHOD AND PROGRAM

(71) Applicant: BRIDGESTONE CORPORATION, Tokyo (JP)

(72) Inventors: Kazuo Uchida, Tokyo (JP); Akihiro Hasegawa, Ageo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 424 days.

(21) Appl. No.: 17/414,962

(22) PCT Filed: Dec. 12, 2019

(86) PCT No.: PCT/JP2019/048790
§ 371 (c)(1),
(2) Date: Jun. 17, 2021

(87) PCT Pub. No.: WO2020/129819
PCT Pub. Date: Jun. 25, 2020

(65) Prior Publication Data
US 2022/0065740 A1     Mar. 3, 2022

(30) Foreign Application Priority Data

Dec. 19, 2018  (JP) .................. 2018-237447

(51) Int. Cl.
*G01M 9/06*  (2006.01)
*B62J 45/20*  (2020.01)
(Continued)

(52) U.S. Cl.
CPC ............... *G01M 9/06* (2013.01); *B62J 45/20* (2020.02); *B62J 45/412* (2020.02); *B62J 45/414* (2020.02); *B62J 50/22* (2020.02)

(58) Field of Classification Search
CPC   G01M 9/06; B62J 45/20; B62J 45/412; B62J 45/414; B62J 50/22; B62J 45/40; G01L 3/24

See application file for complete search history.

(56) References Cited

U.S. PATENT DOCUMENTS 8,612,165 B2   12/2013   Froncioni et al.
9,188,496 B2   11/2015   DeGolier
(Continued)

FOREIGN PATENT DOCUMENTS

CN   104344829 A   2/2015
CN   105408197 A   3/2016
(Continued)

OTHER PUBLICATIONS

Pierre Debraux et al., "Aerodynamic drag in cycling: Methods of assessment", Sports Biomechanics • Sep. 2011; 10(3): pp. 197-218.*

(Continued)

*Primary Examiner* — Alexander Satanovsky
(74) *Attorney, Agent, or Firm* — SOLARIS Intellectual Property Group, PLLC

(57) ABSTRACT

An aerodynamic characteristic estimation device is provided with a detection section to detect at least one of a velocity of a bicycle or an acceleration of the bicycle when being pedaled by a cyclist, a detection section to detect a pedaling power when being pedaled, and an estimation section to estimate aerodynamic drag information indicating an aerodynamic characteristic acting on the bicycle being ridden by the cyclist based on a computation result of mechanical analysis according to an equation of motion established for a direction of progress of the bicycle and using the velocity of the bicycle and the acceleration of the bicycle as obtained (Continued)

from a detection result together with the pedaling power as detected by the detection section.

7 Claims, 13 Drawing Sheets

(51) Int. Cl.
   *B62J 45/412*   (2020.01)
   *B62J 45/414*   (2020.01)
   *B62J 50/22*   (2020.01)

(56) References Cited

U.S. PATENT DOCUMENTS

| | | |
|---|---|---|
| 2004/0189722 A1 | 9/2004 | Acres |
| 2012/0221257 A1* | 8/2012 | Froncioni ............... G01M 9/08 702/45 |
| 2015/0039178 A1 | 2/2015 | Ishii et al. |
| 2015/0345952 A1 | 12/2015 | Chang et al. |
| 2016/0167732 A1 | 6/2016 | Modolo |
| 2017/0074897 A1* | 3/2017 | Mermel ................ A63B 69/16 |
| 2017/0138807 A1 | 5/2017 | Miau et al. |
| 2017/0361891 A1* | 12/2017 | Crowell ................... B62J 45/40 |
| 2018/0257740 A1 | 9/2018 | Kikkawa |

FOREIGN PATENT DOCUMENTS

| | | |
|---|---|---|
| CN | 108025796 A | 5/2018 |
| JP | H07-151620 A | 6/1995 |
| JP | 2013-36833 A | 2/2013 |
| TW | 201639743 A | 11/2016 |
| WO | 2007/038278 A2 | 4/2007 |
| WO | 2011/158365 A1 | 12/2011 |

OTHER PUBLICATIONS

Extended European Search Report dated Jul. 14, 2022 issued in corresponding EP Patent Application No. 19900974.7.
International Search Report issued in International Application No. PCT/JP2019/048790 dated Mar. 3, 2020.
Search Report of the Chinese office action dated Jan. 25, 2022, from the SIPO in a Chinese patent application No. 2019800843997 corresponding to the instant patent application.

* cited by examiner

FIG.6

| CURRENT TIME → | tn | 54.666 |
|---|---|---|
| | tn-1 | 54.131 |
| | tn-2 | 54.112 |
| | ... | ... |
| | t1 | 1.11 |

FIG.7

| CURRENT TIME → | Pmeas(0) | 500 |
|---|---|---|
| | Pmeas(-1) | 560 |
| | Pmeas(-2) | 540 |
| | Pmeas(-3) | 523 |
| | Pmeas(-4) | 511 |
| | ... | ... |

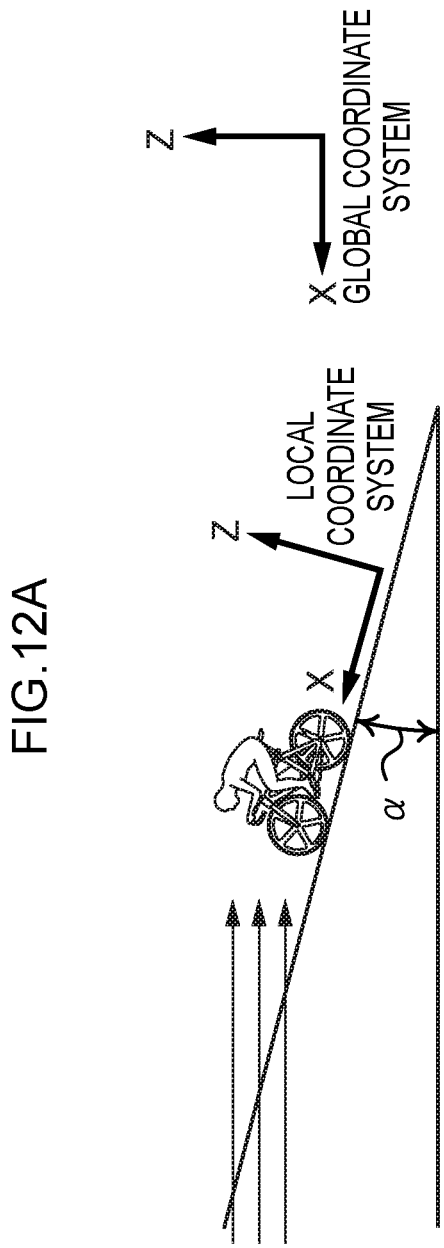

AERODYNAMIC CHARACTERISTIC ESTIMATION DEVICE, AERODYNAMIC CHARACTERISTIC ESTIMATION METHOD AND PROGRAM

TECHNICAL FIELD

The present disclosure relates to an aerodynamic characteristic estimation device, and to an aerodynamic characteristic estimation method and program.

BACKGROUND ART

The performance of a bicycle when the bicycle is in motion is dependent on various characteristics related to the behavior and environment of the bicycle and affecting motion performance of the bicycle. The motion performance of the bicycle when the bicycle is in motion is accordingly obtainable by detecting the behavior and environment of the bicycle in motion using various detectors. For example, an aerodynamic characteristic due to wind and the like has a direct impact on a bicycle in motion. Technology is known for finding an aerodynamic drag area in front of a bicycle when the bicycle is in motion, as one factor of an aerodynamic characteristic (see for example U.S. Pat. No. 8,612,165). In this technology, airflow data including an airflow speed and a yaw angle are acquired, and an aerodynamic drag area corresponding to the acquired airflow is identified based on plural predetermined rules expressing correspondences between airflow data and aerodynamic drag area. Moreover, technology has also been disclosed for finding an area of a bicycle in motion being ridden by a cyclist, as an area projected onto a plane perpendicular to the ground (see for example International Publication (WO) No. 2011/158365).

Technology is also known for obtaining various aspects of motion performance of a bicycle when the bicycle is in motion. For example, technology has been disclosed that focuses on changes in air pressure around a cyclist when a bicycle is in motion. Air pressure is acquired for both a bicycle in motion and a stationary bicycle, and an activity level of the cyclist is obtained that considers the effect of changes in air pressure (see for example Japanese Patent Application Laid-Open (JP-A) No. 2013-36833). Technology has also been disclosed for detecting a pedaling cadence, wind speed, and acceleration to measure the power of the cyclist pedaling the bicycle in real-time (see for example JP-A No. H07-151620).

SUMMARY OF INVENTION

Technical Problem

When a bicycle is in motion, energy needs to be input to counter aerodynamic drag arising from this motion. Aerodynamic drag is related to an aerodynamic drag coefficient and to a projected frontal area. Moving bodies such as aircraft and passenger vehicles have known projected frontal areas and may thus be evaluated using the aerodynamic drag coefficient as an indicator. However, in the case of a bicycle, the projected frontal area is difficult to measure due to the cyclist not maintaining a constant posture when in motion. Although for posture of the cyclist, the posture of the cyclist while pedaling can be estimated by employing a large motion capture device or the like in a wind tunnel test, such an approach is impractical. Moreover, aerodynamic drag when the bicycle is in motion is related to both the aerodynamic drag coefficient and to the projected frontal area, making it necessary to find information pertaining to both the aerodynamic drag coefficient and the projected frontal area when the bicycle is in motion. Considering only the aerodynamic drag area in front of the bicycle for the in-motion bicycle is not sufficient in itself.

Moreover, estimating an aerodynamic characteristic while a bicycle is being pedaled demands complex processing by a large scale system employing many detectors. However, although there is technology to detect various data to obtain various aspects of motion performance of a bicycle when the bicycle is in motion, there is no technology focused on obtaining an aerodynamic characteristic using bicycle mountable sensors.

In consideration of the above circumstances, an object of the present disclosure is to estimate, with a simple configuration, aerodynamic drag information representing an aerodynamic characteristic acting on a bicycle while being ridden by a cyclist.

Solution to Problem

An aerodynamic characteristic estimation device of the present disclosure includes: a velocity detection section configured to detect at least one of a velocity of a bicycle or an acceleration of the bicycle when being pedaled by a cyclist; a pedaling power detection section configured to detect a pedaling power when being pedaled by the cyclist; and an estimation section configured to estimate aerodynamic drag information indicating an aerodynamic characteristic acting on the bicycle being ridden by the cyclist, based on a computation result of mechanical analysis according to an equation of motion established for a direction of progress of the bicycle and using the at least one of the velocity of the bicycle or the acceleration of the bicycle, as obtained from a detection result of the velocity detection section, together with the pedaling power as detected by the pedaling power detection section.

Advantageous Effects

The present disclosure enables aerodynamic drag information expressing an aerodynamic characteristic acting on a bicycle being ridden by a cyclist to be estimated with a simple configuration.

BRIEF DESCRIPTION OF DRAWINGS

FIG. 6 is a diagram depicting an example of data representing a magnetic signal according to an exemplary embodiment.

FIG. 7 is a diagram depicting an example of data representing a pedaling power signal according to an exemplary embodiment.

FIG. 12A is a schematic side view illustrating the mechanics of a state of motion of a bicycle ridden by a cyclist in a case of traveling on a slope with a crosswind.

DESCRIPTION OF EMBODIMENTS

Figure 1:
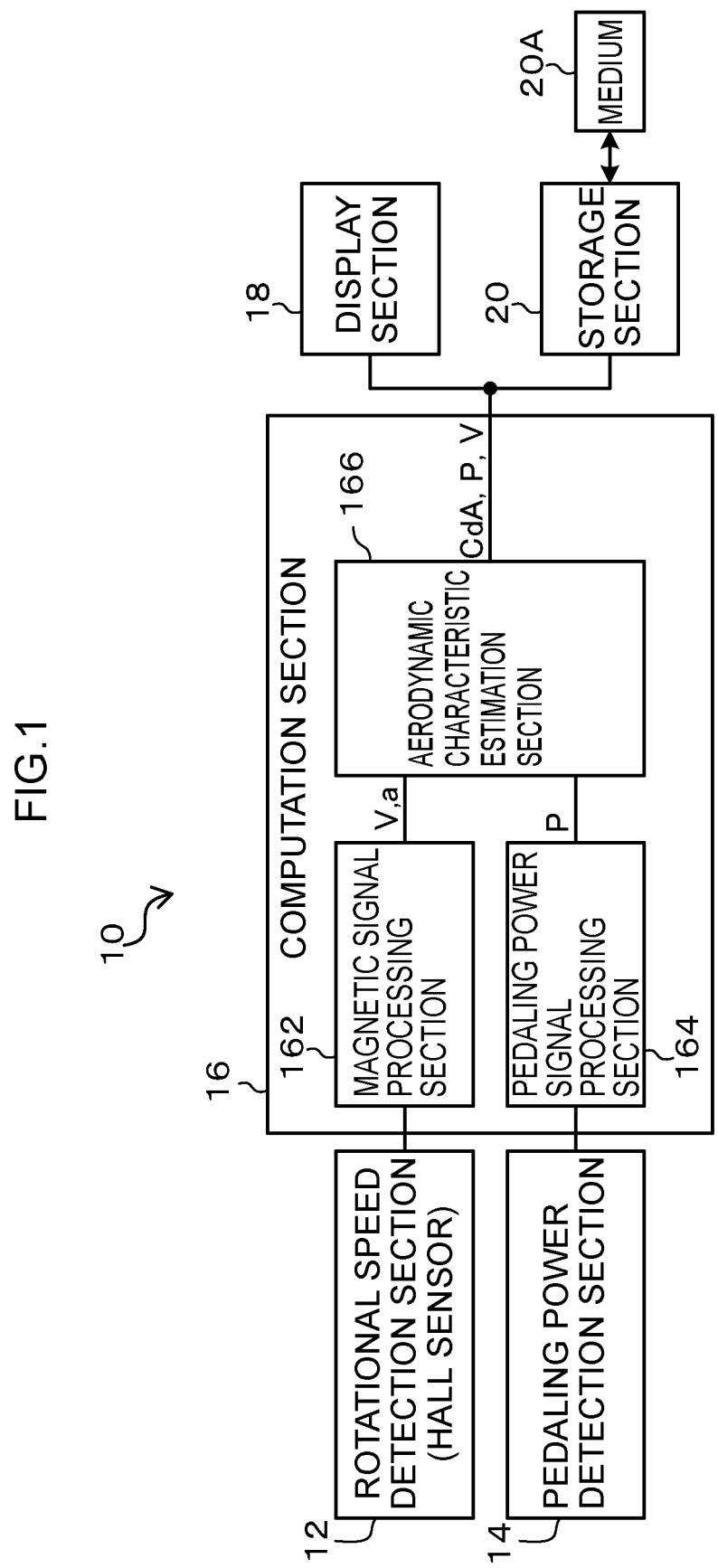
FIG. 1 is a schematic configuration diagram illustrating an example of an aerodynamic characteristic estimation device according to an exemplary embodiment.

Explanation follows regarding an example of an exemplary embodiment of the present disclosure, with reference to the drawings. Note that the arrow X, the arrow Y, and the arrow Z in the drawings correspond to the directions of an X axis, a Y axis, and a Z axis in a three-dimensional coordinate system. The application directions of the present exemplary embodiment are not limited. The present disclosure is not limited by the following exemplary embodiment, and appropriate modifications may be implemented thereto within a range of the object of the present disclosure.

When a bicycle is in motion, an aerodynamic characteristic acting on the bicycle being ridden by a cyclist preferably consider aerodynamic drag. Aerodynamic drag is related to the aerodynamic drag coefficient and to the projected frontal area. In cases in which the projected frontal area is known, as in the case of an aircraft or a passenger vehicle, the aerodynamic drag factor may be employed as an aerodynamic characteristic index. However, the posture of the cyclist changes in the case of a bicycle. Thus instead of treating the aerodynamic drag coefficient and the projected frontal area separately, aerodynamic drag information relating to information about both the aerodynamic drag coefficient and the projected frontal area is preferably employed as an aerodynamic characteristic index. One example of such aerodynamic drag information is information obtained by multiplying the aerodynamic drag coefficient and the projected frontal area together. Although the posture of the cyclist when pedaling may be estimated by employing a largescale system such as motion capture devices or the like in wind tunnel testing, such an approach is impractical. Furthermore, there are limitations to the size and processing power of sensors and computation devices installable to a bicycle. The inventors have focused on such facts, and as will be described in detail later, have discovered that aerodynamic drag information can be derived as an aerodynamic characteristic of the bicycle by employing mechanical analysis using an equation of motion as long as power (for example pedaling power) imparted to the pedals and the velocity of the bicycle can be acquired.

The present exemplary embodiment discloses an aerodynamic characteristic estimation device to efficiently find aerodynamic drag information when a bicycle ridden by a cyclist is in motion, namely during a pedaling action, using trivial equipment.

Aerodynamic Drag Information

First, explanation follows regarding the aerodynamic drag information derived by the aerodynamic characteristic estimation device according to the present exemplary embodiment. Note the present exemplary embodiment examines a case in which a bicycle is traveling over horizontal ground in a wind-free environment. In the following explanation, environmental information such as a density of air p, personal information such as body mass of the cyclist, and bicycle information such as bicycle mass and radius of wheels mounted to the bicycle frame are all already known.

In the present exemplary embodiment, aerodynamic drag information is employed as an index to evaluate an aerodynamic characteristic expressing performance relating to aerodynamic drag (referred to hereafter as aerodynamic performance). Drag $F_{drag}$, which is a resistance acting on the bicycle moving through air, can be expressed by the following Equation (1). Wherein, in this equation p is the density of air, V is the bicycle velocity, $C_d$ is the aerodynamic drag coefficient, and A is the projected frontal area. A value resulting from multiplying the aerodynamic drag coefficient $C_d$ and the projected frontal area A together ($=C_d \times A$) is a value of aerodynamic drag information, namely a value CdA.

$$F_{drag} = C_d \cdot A \cdot \frac{1}{2}\rho V^2 \quad (1)$$

A case is examined of aerodynamic drag information for a case in which a bicycle is traveling over horizontal ground in a wind-free environment.

Figure 2:
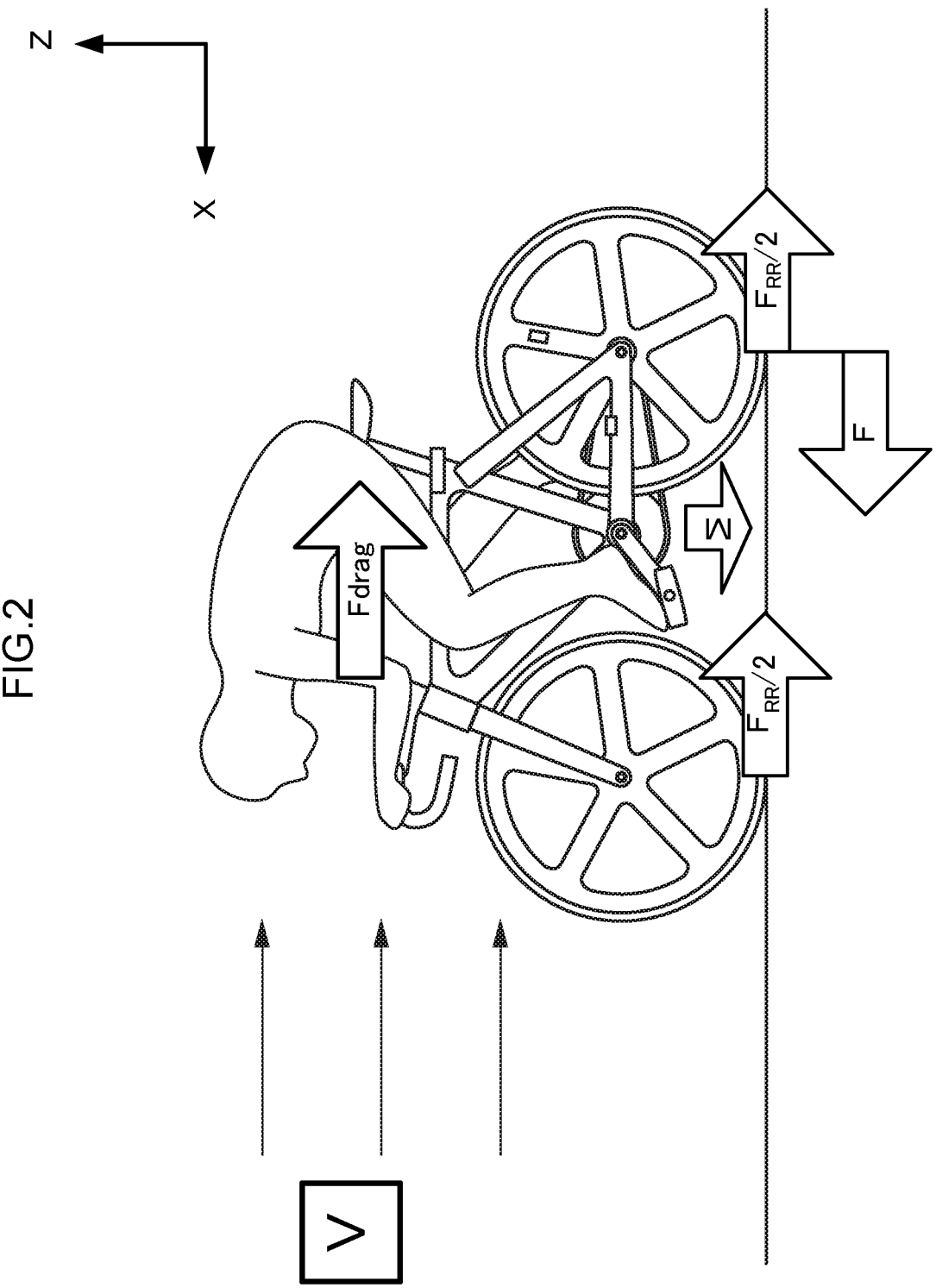
FIG. 2 is a schematic diagram illustrating the mechanics of a state of motion of a bicycle ridden by a cyclist from a mechanical perspective in an exemplary embodiment.

FIG. 2 is a schematic diagram produced based on a mechanical perspective of a state of motion of a bicycle being ridden by a cyclist.

As illustrated in FIG. 2, in a case in which the bicycle is traveling over horizontal ground in a wind-free environment, a drag $F_{drag}$, which is resistance acting on the bicycle arising due to a wind velocity V corresponding to the velocity V of the bicycle, is imparted to the bicycle. Forces acting on the bicycle include a force $F_{RR}$ due to rolling resistance, and a force in the direction of progress generated at a ground contact point of the bicycle rear wheel, i.e. the driven wheel. Note that in FIG. 2, since both the front and rear wheels of the bicycle contact the ground, for ease of explanation a case is envisaged in which the rolling resistance is divided into two.

An equation of motion established in terms of the direction of progress when the bicycle is in motion as illustrated in FIG. 2 can be expressed by Equation (2) below.

In Equation (2), $$Ma = F - F_{drag} - F_{RR} \quad (2)$$

Wherein in Equation (2), M is a total mass resulting from adding the mass of the bicycle and the mass of the cyclist together, and a is an acceleration of the bicycle. F is a force in the direction of progress (referred to hereafter as propulsion force) generated at the ground contact point of the bicycle rear wheel. F represents the rolling resistance of the tires for the wheels of the bicycle. Note that the rolling resistance F may be expressed as a function that changes according to the velocity of the bicycle.

Substituting Equation (1) into Equation (2) enables Equation (3) to be obtained.

$$Ma = F - \frac{1}{2}\rho CdAV^2 - F_{RR} \quad (3)$$

As in the Equation (4) below, the velocity V of the bicycle corresponds to a radius R measured to the ground contact point of the bicycle rear wheel multiplied by a rotational speed ω of the bicycle rear wheel (V=R·ω). Accordingly, as illustrated in Equation (5) below, an acceleration a of the bicycle corresponds to the radius R measured to the ground contact point of the bicycle rear wheel multiplied by a rotational acceleration (dω)/dt) of the bicycle rear wheel (a=R·(dω)/dt)). Moreover, as in Equation (6) below, the propulsion force F multiplied by the velocity V of the bicycle corresponds to the power imparted to the bicycle by the cyclist, namely equates to the power imparted to the bicycle pedals (referred to hereafter as pedaling power) (P=F·V). Accordingly, by solving Equation (6) for the propulsion force F and substituting using Equation (4), the propulsion force F of the bicycle can be expressed by Equation (7).

$$V = R \cdot \omega \quad (4)$$

$$a = R \cdot (d\omega/dt) \quad (5)$$

$$P = F \cdot V \quad (6)$$

$$F = P/R\omega \quad (7)$$

Using Equation (4) to Equation (7) for substitution into Equation (3), and the rearranging in terms of the aerodynamic drag information Cda obtains an expression of the aerodynamic drag information Cda as in Equation (8) below.

$$CdA = \frac{2}{\rho \cdot R^2 \cdot \omega^2}\left(\frac{P}{R \cdot \omega} - M \cdot R \cdot (d\omega/dt) - F_{RR}\right) \quad (8)$$

Since the density of air ρ, the total mass M, the wheel radius R, and the rolling resistance $F_{RR}$ of Equation (8) are already known, the aerodynamic drag information Cda can be obtained by finding a pedaling power P, the rotational speed ω of the bicycle rear wheel, and the rotational acceleration (dω)/dt).

Aerodynamic Characteristic Estimation Device

Next, explanation follows regarding an aerodynamic characteristic estimation device capable of estimating the aerodynamic drag information Cda as examined from the above mechanical perspective.

The aerodynamic characteristic estimation device according to the present exemplary embodiment efficiently finds aerodynamic drag information for a bicycle being ridden by a cyclist from detection results detecting the force acting on the pedals fitted to bicycle and detecting the velocity of the bicycle. Namely, an aerodynamic characteristic estimation device 10 according to the present exemplary embodiment includes: a velocity detection section configured to detect at least one of a velocity of a bicycle or an acceleration of the bicycle when being pedaled by a cyclist; a pedaling power detection section configured to detect a pedaling power when being pedaled by the cyclist; and an estimation section configured to estimate aerodynamic drag information indicating an aerodynamic characteristic acting on the bicycle being ridden by the cyclist, based on a computation result of mechanical analysis according to an equation of motion established for a direction of progress of the bicycle and using the at least one of the velocity of the bicycle or the acceleration of the bicycle, as obtained from a detection result of the velocity detection section, together with the pedaling power as detected by the pedaling power detection section.

FIG. 1 illustrates an example of a schematic configuration of the aerodynamic characteristic estimation device 10 according to the present exemplary embodiment.

The aerodynamic characteristic estimation device 10 according to the present exemplary embodiment includes a rotational speed detection section 12, a pedaling power detection section 14, a computation section 16, a display section 18, and a storage section 20. The computation section 16 includes a magnetic signal processing section 162, a pedaling power signal processing section 164, and an aerodynamic characteristic estimation section 166.

The rotational speed detection section 12 detects a rotational speed of a wheel of a bicycle when the bicycle is in motion. The rotational speed detection section 12 of the present exemplary embodiment detects a rotational speed of a bicycle rear wheel being rotated by pedaling of the cyclist and outputs a rotational speed signal. As an example of the rotational speed detection section 12, explanation follows regarding a case in which a magnetic sensor such as a Hall sensor is employed in which a magnet attached to at least one location on the bicycle rear wheel is detected as passing by the magnetic sensor as the rear wheel rotates, and the detected magnetic signal is then output. As will be described in detail later, the rotational speed of the wheel of the bicycle and the velocity of the bicycle, as well as the acceleration of the bicycle, can be derived from time intervals between the magnet passing the magnetic sensor, namely from time intervals between magnetic signals.

The pedaling power detection section 14 detects a force imparted to the bicycle when the bicycle is in motion. The pedaling power detection section 14 of the present exemplary embodiment detects load acting on the pedals from the cyclist and may, for example, be capable of detecting, as pedaling power, at least a load from the cyclist acting on the pedals attached to cranks of the bicycle. In the present exemplary embodiment, as an example of the pedaling power detection section 14, explanation follows regarding a case in which a pedaling power meter is employed to detect the pedaling power, which is the load acting on the pedals, at a predetermined specific periodicity and to output this as a pedaling power signal.

Figure 3:
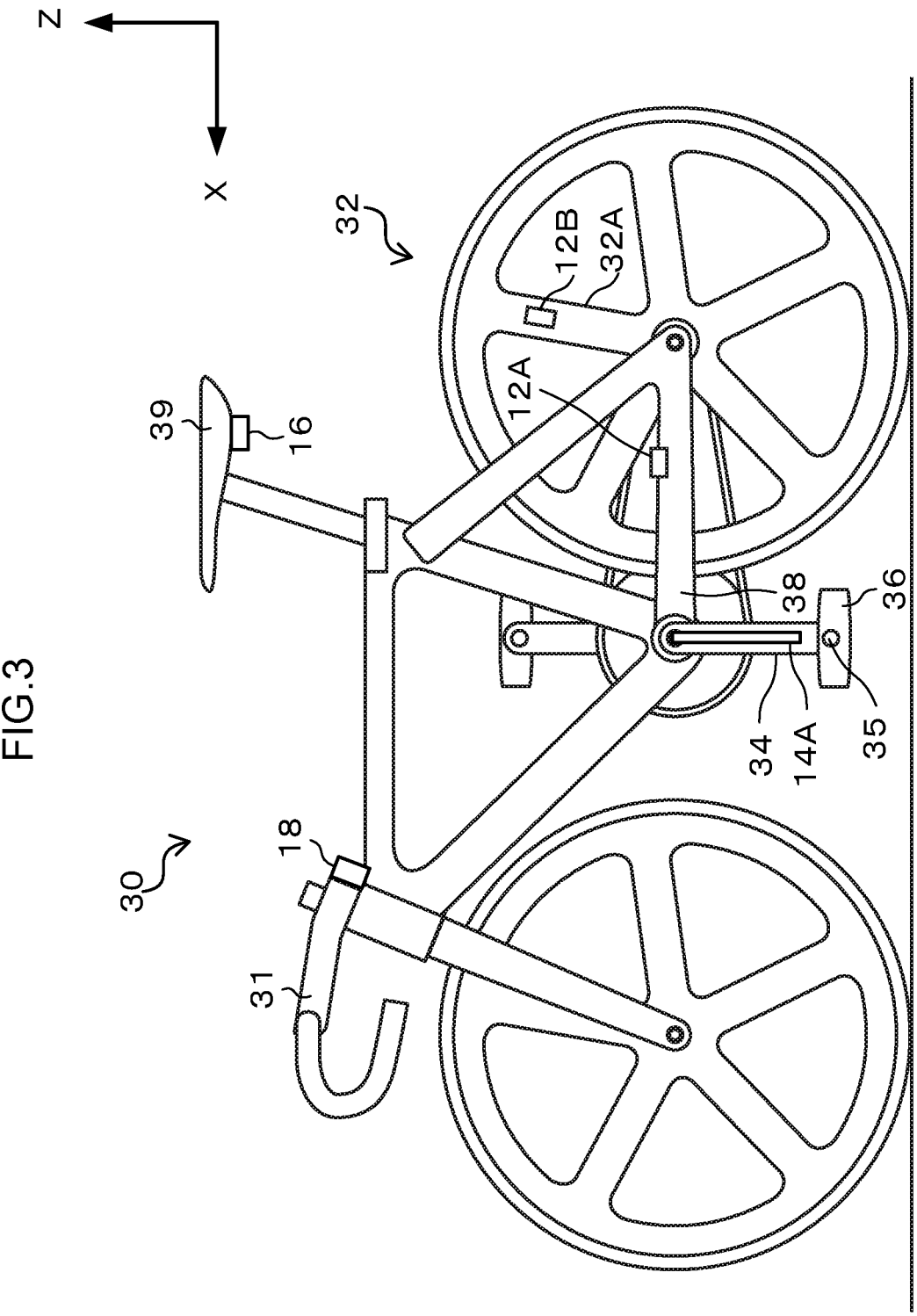
FIG. 3 is a schematic configuration diagram illustrating an aerodynamic characteristic estimation device according to an exemplary embodiment and a bicycle applied with the aerodynamic characteristic estimation device.

FIG. 3 illustrates a schematic configuration of an aerodynamic characteristic estimation device according to the present exemplary embodiment and a bicycle applied with the aerodynamic characteristic estimation device.

As illustrated in FIG. 3, a bicycle 30 includes a pedal 36 attached to a crank 34, which in turn is rotatably attached to a frame 38. A pedaling power meter 14A is attached to the crank 34 to detect pedaling power as load acting on the pedal. The pedaling power meter 14A is an example of the pedaling power detection section 14. A magnetic sensor 12A is attached to a rear wheel side at a rear (at the opposite direction to the X direction in FIG. 3) of the frame 38. A rear wheel 32 is rotatably attached at a rear (at the opposite direction to the X direction in FIG. 3) of the frame 38. A magnet 12B is attached to a spoke 32A of the rear wheel 32. Regarding the magnetic sensor 12A and the magnet 12B, the magnetic sensor 12A and the magnet 12B are attached at positions a substantially equal distance from the rotation center of the rear wheel 32 so as to enable passing of the magnet 12B to be detected by the magnetic sensor 12A. Passing of the magnet 12B accompanying rotation of the rear wheel 32 is accordingly detectable by the magnetic sensor 12A. Note that the magnetic sensor 12A and the magnet 12B are an example of the rotational speed detection section 12.

The display section 18 of the aerodynamic characteristic estimation device 10 is attachable behind (the opposite direction to arrow X in FIG. 3) a central portion on a cyclist side of a handlebar 31 of the bicycle 30. The display section 18 is preferably installed at a position visible to the cyclist and avoiding the wind from in front of the bicycle 30 as far as possible. Note that the position of the display section 18 of the aerodynamic characteristic estimation device 10 is not limited to the position illustrated in FIG. 3.

The computation section 16 of the aerodynamic characteristic estimation device 10 is attachable below (the opposite direction to arrow Z in FIG. 3) a saddle 39 of the bicycle 30. The computation section 16 does not need to be visible to the cyclist and so may be positioned at any position avoiding the wind from in front of the bicycle 30 as far as possible. Note that the position of the computation section 16 of the aerodynamic characteristic estimation device 10 is not limited to the position illustrated in FIG. 3. For example, the position of the computation section 16 may be installed behind the cyclist or placed inside a pocket of the cyclist as long as a configuration is adopted in which signals and data can be exchanged between the computation section 16 and the other sections by wireless communication.

The computation section 16 estimates aerodynamic drag information for the bicycle being ridden by the cyclist using a mechanical analysis computation according to Equation (8) employing the magnetic signal from the bicycle rear wheel as detected by the rotational speed detection section 12 and employing the pedaling power signal as detected by the pedaling power detection section 14. The computation section 16 then outputs the computation result to the display section 18 and the storage section.

Specifically, the magnetic signal processing section 162 in the computation section 16 includes a signal processing function to process the magnetic signal from the rotational speed detection section 12 and a function to find velocity data expressing the velocity V of the bicycle and acceleration data expressing the acceleration a of the bicycle, and to output these data. The pedaling power signal processing section 164 in the computation section 16 includes a signal processing function to process the pedaling power signal from the pedaling power detection section 14, and includes a function to find pedaling power data expressing a pedaling power P imparted to the pedal and to output this data.

The aerodynamic characteristic estimation section 166 estimates the aerodynamic drag information Cda by mechanical analysis employing the velocity data expressing the velocity V of the bicycle and the acceleration data expressing the acceleration a of the bicycle obtained from the magnetic signal processing section 162, employing the pedaling power data expressing the pedaling power P obtained from the pedaling power signal processing section 164, and employing known data. Namely, the aerodynamic characteristic estimation section 166 estimates the aerodynamic drag information Cda by deriving the CdA value according to Equation (8) by employing the velocity data and acceleration data of the bicycle, the pedaling power data obtained from the pedaling power signal processing section 164, and known data of a density of air $\rho$, a total mass M, a wheel radius R, and a rolling resistance $F_{RR}$.

The display section 18 is a device such as a display device for data expressing the aerodynamic drag information Cda as estimated by the computation section 16.

The storage section 20 is a device such as a storage device capable of storing at least data expressing the aerodynamic drag information Cda as estimated by the computation section 16. The storage section 20 includes a detachable medium 20A such as a memory card and an interface capable of reading and writing to the detachable medium 20A, and is able to store the data expressing the aerodynamic drag information Cda as estimated by the computation section 16 on the medium 20A.

Note that the aerodynamic characteristic estimation device 10 may be provided with an input section (not illustrated in the drawings) for inputting various data such as personal data regarding the cyclist including the mass of the cyclist, and structural data expressing the structure of the bicycle including the wheel radius. In such cases, the input section may be employed for input to switch information displayed on the display section 18.

The rotational speed detection section 12 illustrated in FIG. 1 is an example of a sensor in the velocity detection section of the present disclosure for detecting at least one out of the velocity or acceleration of the bicycle. Moreover, the rotational speed detection section 12 and the magnetic signal processing section 162 are examples of functional sections for obtaining the velocity and acceleration of the bicycle in order to estimate the aerodynamic drag information from the detection results of the velocity detection section of the present disclosure. The pedaling power detection section 14 is an example of a sensor in the pedaling power detection section of the present disclosure for detecting the pedaling power when being pedaled. The pedaling power detection section 14 and the pedaling power signal processing section 164 of the computation section 16 are an example of a functional section for obtaining pedaling power in order to estimate the aerodynamic drag information from the detection results of the pedaling power detection section of the present disclosure. The computation section 16 and the aerodynamic characteristic estimation section 166 are examples of the estimation section of the present disclosure. The display section 18 is an example of a display section to display aerodynamic drag information of the present disclosure. The storage section 20 is an example of a storage section to store aerodynamic drag information of the present disclosure.

Velocity and Acceleration of Bicycle

Next, explanation follows regarding an example of a method for deriving the velocity and acceleration of the bicycle in real time.

The magnetic signal processing section 162 in the computation section 16 performs signal processing on the magnetic signal from the rotational speed detection section 12, and finds velocity data expressing the velocity V of the bicycle and acceleration data expressing the acceleration a of the bicycle.

Figure 4:
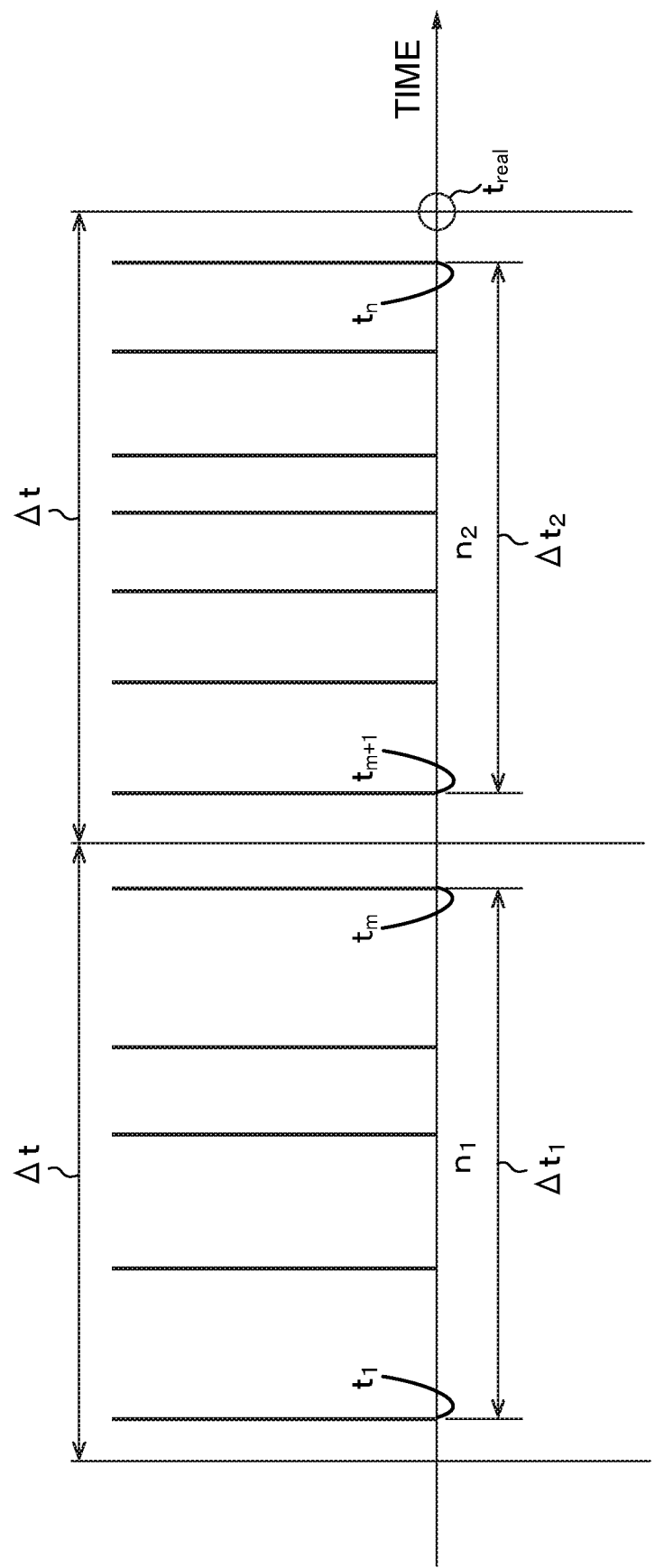
FIG. 4 is a diagram depicting an example of a magnetic signal when a bicycle is in motion according to an exemplary embodiment.

FIG. 4 illustrates an example of a magnetic signal from the rotational speed detection section 12 when the bicycle is in motion, for input to the magnetic signal processing section 162.

As illustrated in FIG. 4, in the present exemplary embodiment the velocity V and the acceleration a of the bicycle are found for $2\Delta t$, this being two specific periods of a predetermined specific period $\Delta t$. Specifically, the velocity V and the acceleration a of the bicycle are found from an average value for $2\Delta t$, this being two specific periods, as found in the following manner.

Take a case in which timing $t_1$ to timing $t_n$ are the input timings of a magnetic signal in the period of $2\Delta t$ earlier than a current timing $t_{real}$. Also say that in such a case the number of times the magnetic signal has been input during a first specific period Δt is $n_1$, and the number of times the magnetic signal has been input during a second specific period Δt is $n_2$. Moreover, in a case in which $t_1$ is the timing the magnetic signal was first input during the first specific period Δt and $t_m$ is the timing the magnetic signal was last input during the first specific period Δt, then a first time interval $\Delta t_1$ is a time interval between the timing $t_1$ and the timing $t_m$. Similarly in a case in which $t_{m+1}$ is the timing the magnetic signal is first input for the next second specific period Δt and $t_n$ is the timing the magnetic signal is last input for the next second specific period Δt, then a second time interval $\Delta t_2$ is a time interval between the timing $t_{m+1}$ and timing $t_n$.

In the example illustrated in FIG. 4, a frequency $f_1$ during the first specific period Δt can be expressed by Equation (9) below, and a velocity $V_1$ during the first specific period Δt can be expressed by Equation (10) below. Similarly, a frequency $f_2$ during the second specific period Δt can be expressed by Equation (11) below, and a velocity $V_2$ during the second specific period Δt can be expressed by Equation (12) below.

$$f_1 = n_1/\Delta t_1 \qquad (9)$$

$$V_1 := 2\pi f_1 R \qquad (10)$$

$$f_2 = n_2/\Delta t_2 \qquad (11)$$

$$V_2 := 2\pi f_2 R \qquad (12)$$

The velocity V of the bicycle is then found by taking an average value of the velocity $V_1$ during the first specific period Δt and the velocity $V_2$ during the second specific period Δt, as expressed in Equation (13). Moreover, the acceleration a is found by taking the differential of the velocity V of the bicycle as expressed in Equation (14).

$$V = \text{ave}(V_1, V_2) = \pi R(f_1 + f_2) \qquad (13)$$

$$a = \frac{V_2 - V_1}{dt} = \frac{2\pi R(f_2 - f_1)}{\Delta t} \qquad (14)$$

Note that to simplify the device in the present exemplary embodiment, the velocity V and the acceleration a are found by employing Equation (13) and Equation (14). However, there is no limitation thereto, and the velocity V and the acceleration a may be found using a known derivation method for finding the velocity V and the acceleration a. For example, measurement values from an acceleration sensor may be employed for the acceleration a. Alternatively, since the velocity V and the acceleration a obtained may sometimes include noise components, a filtering process with a low pass filter or the like is preferably performed on the derived velocity V and acceleration a.

Pedaling Power

Next, explanation follows regarding an example of a method for deriving the pedaling power imparted to the bicycle in real time.

The pedaling power signal processing section 164 in the computation section 16 performs signal processing on the pedaling power signal from the pedaling power detection section 14 in order to find the pedaling power data expressing the pedaling power P imparted to the pedal. For example, as the pedaling power data expressing the pedaling power P, an average value of a pedaling power signal $P_{meas}$ may be derived over a time range satisfying $$-2\Delta t + t_{real} < t \leq t_{real} \qquad (15)$$

Note that the deriving method employed to find the pedaling power data expressing the pedaling power P is not limited thereto, and any other known derivation method may be employed to find the pedaling power data expressing the pedaling power P from plural pedaling power signals.

Figure 5:
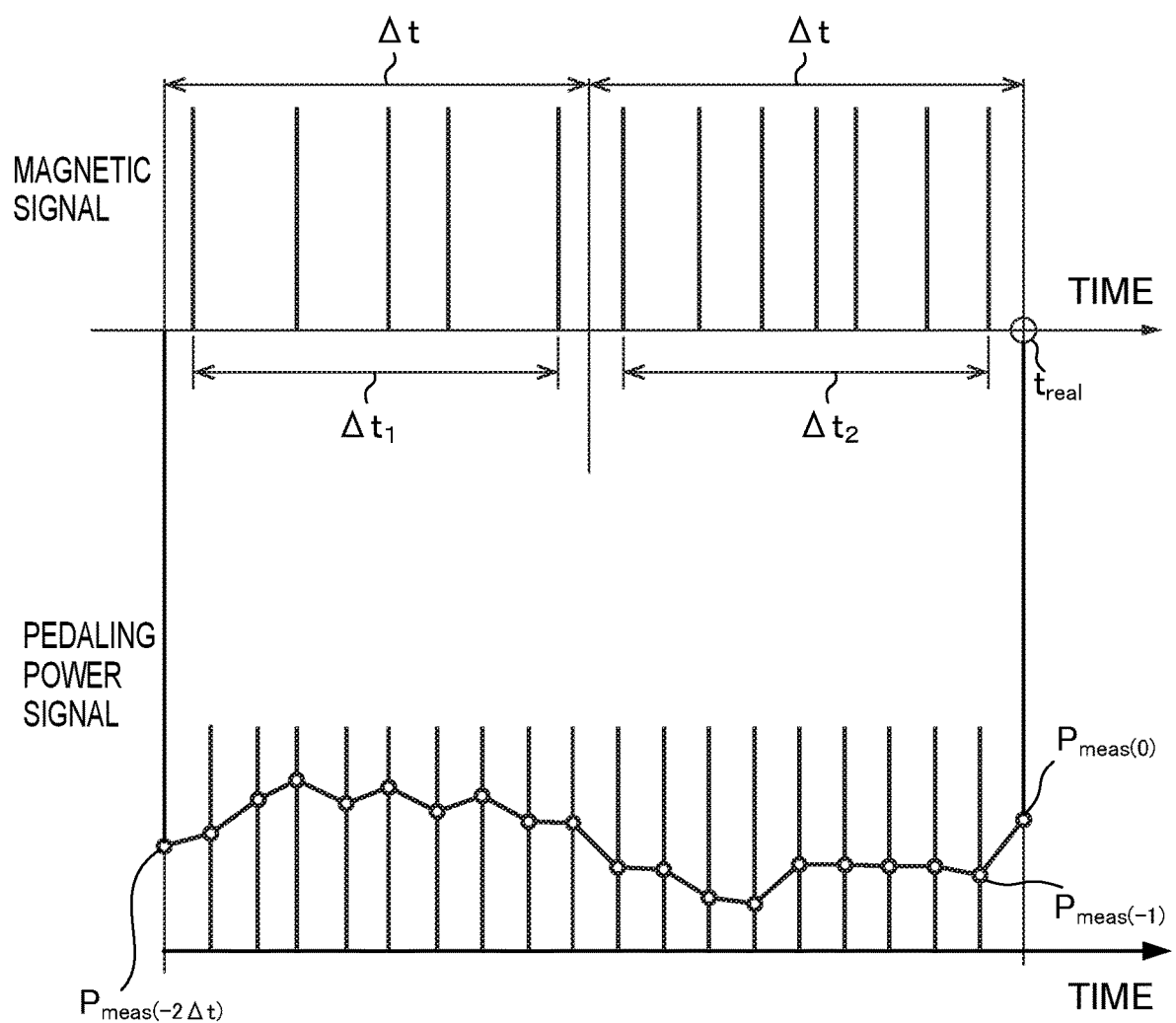
FIG. 5 is a diagram depicting an example of a pedaling power signal when a bicycle is in motion according to an exemplary embodiment.

FIG. 5 illustrates an example of the pedaling power signal from the pedaling power detection section 14 that is input to the pedaling power signal processing section 164 when the bicycle is in motion.

As illustrated in FIG. 5, in the present exemplary embodiment the pedaling power signal from the pedaling power detection section 14 is input at a constant periodicity. In this case, $P_{meas}(0)$ is the pedaling power signal obtained at the current timing $t_{real}$, $P_{meas}(-1)$ is the pedaling power signal immediately prior thereto, and $P_{meas}(-2\Delta t)$ is the pedaling power signal first obtained further back by the two specific periods 2Δt. The pedaling power P is then found by taking an average value of the magnitude of the pedaling power, this being the strength of the pedaling power signal obtained over the two specific periods 2Δt, such as in the example illustrated in Equation (15A).

$$P = \text{ave}(P_{meas}(-2\Delta t), P_{meas}(-2\Delta t+1) \ldots, P_{meas}(0))) \qquad (15A)$$

As described above, in the present exemplary embodiment plural magnetic signals that have been input from the rotational speed detection section 12 to the magnetic signal processing section 162 are employed to derive the velocity and acceleration of the bicycle. Moreover, plural pedaling power signals that have been input from the pedaling power detection section 14 to the pedaling power signal processing section 164 are employed in order to derive the pedaling power imparted to the bicycle. Accordingly, plural data expressing each of the magnetic signals and plural data expressing each of the pedaling power signals are preferably temporarily stored to derive the velocity, acceleration, and pedaling power of the bicycle in real time. Namely, memory is preferably provided to temporarily store the respective data of the magnetic signal processing section 162 and the pedaling power signal processing section 164.

FIG. 6 illustrates an example of data expressing the temporarily stored magnetic signal.

The magnetic signal can be ascertained at a signal periodicity that fluctuates according to the rotational speed of the wheel. Thus, as illustrated in FIG. 6, time series data corresponding to input timings of the magnetic signal may be stored. For example, time series data may be at current timings for the time points when the magnetic signal was input. The number of time series data points stored for the magnetic signal, or the memory capacity dedicated to storing the time series data, may be set to a number of data points, or to a memory capacity dedicated to storing this data, as anticipated to be employed in the method described above to derive the velocity and acceleration of the bicycle in real time.

FIG. 7 illustrates an example of data expressing the pedaling power signal as temporarily stored.

The pedaling power signal is input as pedaling power values of the pedaling power of the cyclist imparted to the pedal as sequentially detected. Thus, as illustrated in the example of FIG. 7, the pedaling power values expressing the pedaling power signal may be stored as data. The number of data points stored as the pedaling power signal, or the memory capacity dedicated to storing this data, may be set to a number of data points, or to a memory capacity dedicated to storing this data, as anticipated to be employed in the method as described above to derive the pedaling power imparted to the bicycle in real time.

Note that although in the present exemplary embodiment explanation has been given of an example of a case in which the velocity and acceleration of the bicycle and the pedaling power are found for the two specific periods 2Δt, there is not limitation to two as the number of specific periods, and an approach may be adopted in which data is handled for a predetermined plural number of periods, such as three or more thereof.

Computer System

The aerodynamic characteristic estimation device 10 described above may be realized by a computer system including a control section configured by a general purpose computer.

Computer System Configuration

Figure 8:
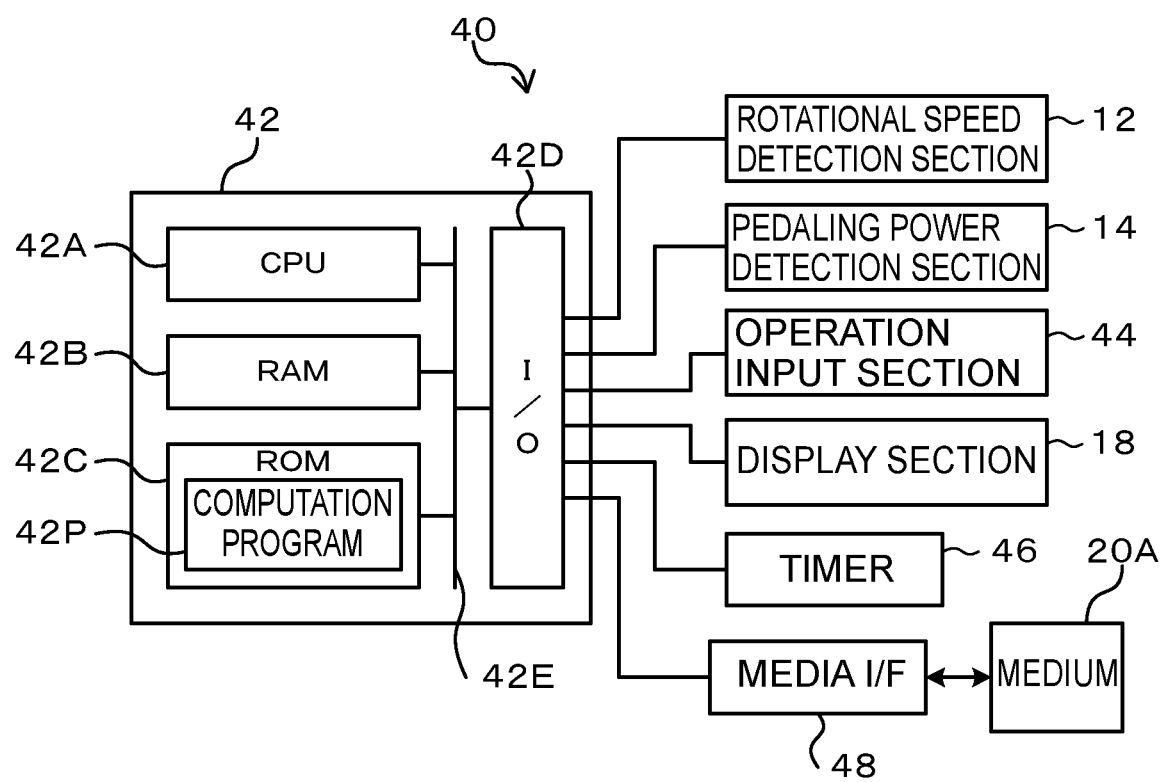
FIG. 8 is a block diagram illustrating a schematic configuration of an example of a computer system capable of functioning as an aerodynamic characteristic estimation device according to an exemplary embodiment.

FIG. 8 illustrates a schematic configuration of a computer system 40 capable of functioning as the aerodynamic characteristic estimation device 10. Note that the computer system 40 may be applied to a cycling computer mounted to the bicycle 30. The computer system 40 may also be applied to an electronic device including a CPU, such as a mobile electronic device or a modular computer.

The computer system 40 includes a control section 42 that functions as the computation section 16. The control section 42 is configured by a computer including a CPU 42A, RAM 42B, ROM 42C, and an I/O 42D. The CPU 42A, the RAM 42B, the ROM 42C, and the I/O 42D are connected to a bus 42E so as to be capable of exchanging data and commands. A computation program 42P is stored on the ROM 42C. The computation program 42P includes processes that cause the control section 42 to function as the magnetic signal processing section 162, the pedaling power signal processing section 164, and the aerodynamic characteristic estimation section S166 of the computation section 16.

The rotational speed detection section 12, the pedaling power detection section 14, an operation input section 44, the display section 18, a timer 46 including a current timing output function and a set duration measurement function, and a media interface (media I/F hereafter) 48 are connected to the I/O 42D. The media I/F 48 is an example of a device such as a storage device capable of storing at least data expressing the aerodynamic drag information Cda as estimated by the computation section 16. The medium 20A such as a memory card is detachably mounted to the media I/F 48, and the media I/F 48 includes an interface capable of reading and writing to the medium 20A. The media I/F 48 is thus capable of storing data that expresses the derived aerodynamic drag information Cda on the medium 20A.

The operation input section 44 is a device for inputting various data, such as personal data of the cyclist, including the mass of the cyclist, and structural data expressing the structure of the bicycle including the wheel radius. Note that the respective data, such as this personal data and structural data relating to the bicycle, may be stored in advance on the ROM 42C. The operation input section 44 may also be employed as an input device for an operation to switch the information displayed on the display section 18. The operation input section 44 may also function as an input device to input various setting values to the computer system 40. Examples of the various setting values input are setting values of a sampling frequency for obtaining the magnetic signal and a sampling frequency for obtaining the pedaling power signal.

Other examples of the various setting values include setting values for a measurement duration and a measurement start time for estimating the aerodynamic drag information when the bicycle is in motion, a setting value for display of the current timing, a refresh time for updating display of the display section 18, and selection instruction setting values for physical quantities to be displayed on the display section 18.

Based on these setting values, the control section 42 is capable of estimating the aerodynamic drag information when the bicycle is in motion, displaying estimation results and storing these on the medium, and causing other information to be displayed.

In the control section 42, the CPU 42A reads the computation program 42P stored on the ROM 42C, expands the computation program 42P in the RAM 42B, and executes the expanded computation program 42P such that the control section 42 operates as the computation section 16 of the aerodynamic characteristic estimation device 10.

Computer System Operation

Next, explanation follows regarding an example of specific processing performed by the control section 42 of the computer system 40 according to the present exemplary embodiment.

In the present exemplary embodiment, processing is executed in the control section 42 of the computer system 40 according to a routine for initial setting, for in-motion measurement, and for measurement result recording.

Figure 9:
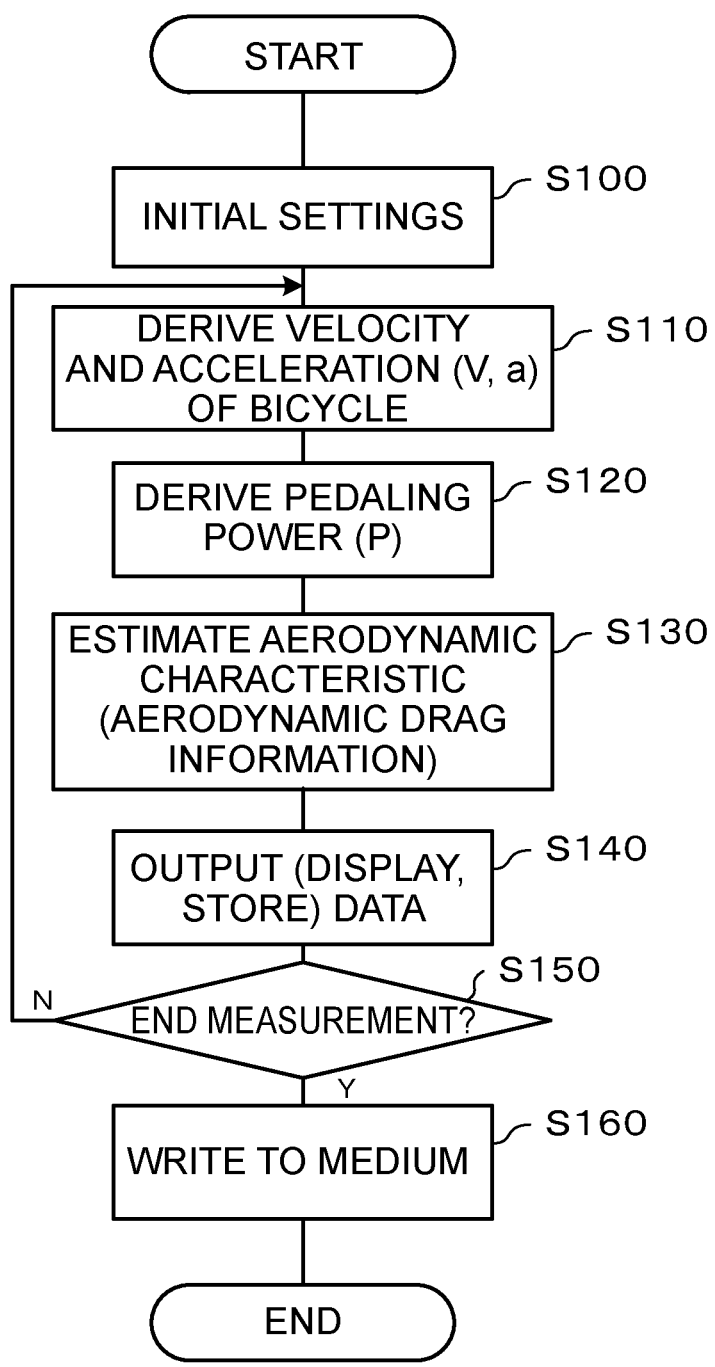
FIG. 9 is a flowchart illustrating an example of a flow of processing by a computer system according to an exemplary embodiment.

FIG. 9 is a flowchart illustrating an example of a flow of processing according to the routine executed by the control section 42 of the computer system 40 according to the present exemplary embodiment.

Note that the processing in FIG. 9 is started when a non-illustrated power switch of the computer system 40 is switched ON. The processing in FIG. 9 may also be started when a command has been input from the operation input section 44 by instruction from a cyclist.

First, at step S100, the CPU 42A executes initial settings. The initial settings are processing to acquire setting values employed to estimate aerodynamic drag information when the bicycle is in motion and to set these as processing conditions. Specifically, operation input values input by operation of the cyclist to the operation input section 44 are acquired as the setting values. Namely, various data are input as setting values, such as personal data of the cyclist including the mass of the cyclist, and structural data expressing the structure of the bicycle including the wheel radius. Examples of the setting values include setting values for the frequency of sampling to obtain the magnetic signals, the frequency of sampling to obtain the pedaling power signal, and also settings values for the format of the aerodynamic drag information to be stored on the medium 20A.

Note that this various data may be stored in advance on the ROM 42C, or may be stored in advance on the medium 20A and acquired by reading from the medium 20A. Alternatively, the various data may be standard setting values pre-stored on the ROM 42C, and these stored standard values then acquired.

Measurement is started when a non-illustrated start measurement button of the operation input section 44 is pressed.

At the next step S110, the CPU 42A executes processing to derive the velocity V and the acceleration a of the bicycle. As described above, plural magnetic signals from the rotational speed detection section 12 are employed to derive the velocity V and the acceleration a of the bicycle.

Explanation follows regarding processing to store the plural magnetic signal employed to derive the velocity V and the acceleration a of the bicycle at step S110.

Figure 10:
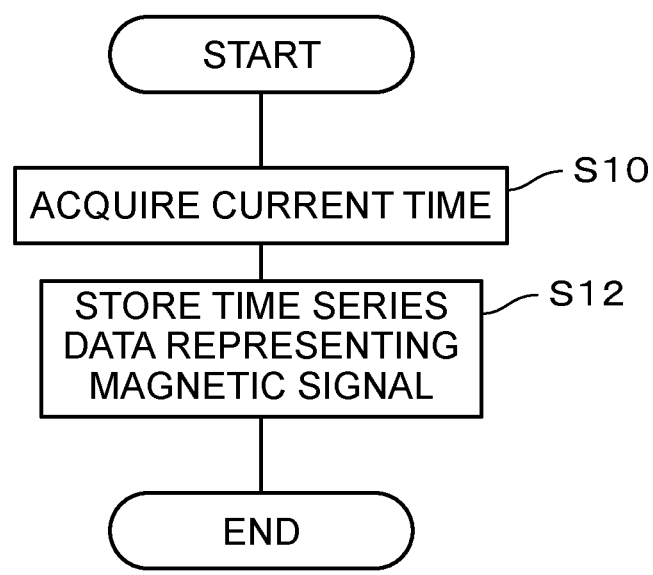
FIG. 10 is a flowchart illustrating an example of a flow of processing to store time series data representing a magnetic signal according to an exemplary embodiment.

FIG. 10 is a flowchart illustrating an example of a flow of processing to store time series data expressing the magnetic signal that was detected and output by the rotational speed detection section 12. The processing in FIG. 10 is executed as interrupt processing when a magnetic signal has been input from the rotational speed detection section 12.

First, at step S10, the CPU 42A acquires data expressing the current timing from the timer 46, and at the next step S12, the acquired data is stored as time series data expressing the magnetic signal in the RAM 42B (see FIG. 6), for example. The interrupt processing is then ended. In this manner, the time series data expressing the magnetic signal is stored sequentially.

Then, at step S110 in FIG. 10, velocity data expressing the velocity V of the bicycle and acceleration data expressing the acceleration a of the bicycle are found according to the methods described above for deriving the velocity and acceleration of the bicycle in real time.

At the next step S120, the CPU 42A derives the pedaling power P imparted to the bicycle. As described above, plural pedaling power signals from the pedaling power detection section 14 are employed to derive the pedaling power P.

Explanation follows regarding processing to store the plural pedaling power signals employed at step S120 to derive the pedaling power P.

Figure 11:
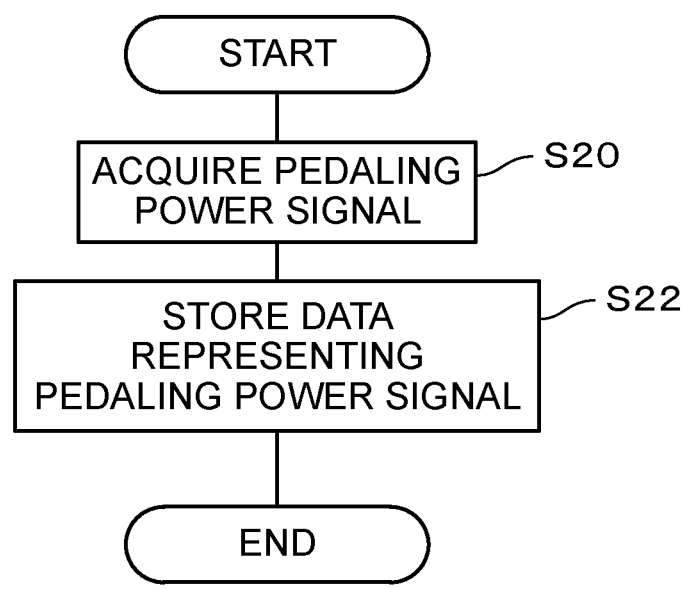
FIG. 11 is a flowchart illustrating an example of a flow of processing to store data representing a pedaling power signal according to an exemplary embodiment.

FIG. 11 is a flowchart illustrating an example of a flow of processing to store data expressing the pedaling power signal detected and output by the pedaling power detection section 14. The processing in FIG. 11 is executed as the interrupt processing in cases in which the pedaling power signal output periodically from the pedaling power detection section 14 has been input.

First, at step S20, the CPU 42A acquires a pedaling power signal, and at the next step S22, data expressing the acquired pedaling power signal, namely a pedaling power values that have been sequentially detected by the pedaling power detection section 14, are stored in the RAM 42B (see FIG. 7), for example. The interrupt processing is then ended. In this manner, data expressing the pedaling power signal is stored sequentially.

At step S120 in FIG. 9, pedaling power data expressing the pedaling power P is found according to the method described above for deriving the pedaling power imparted to the bicycle in real time.

At the next step S130, aerodynamic characteristic estimation is performed by deriving the aerodynamic drag information Cda based on Equation (8) and employing the initial values set at step S100, the velocity data expressing the velocity V of the bicycle and the acceleration data expressing the acceleration a of the bicycle as derived at step S110, and the pedaling power data expressing the pedaling power P derived at step S120.

At the next step S140, the aerodynamic drag information Cda expressing the aerodynamic characteristic estimated at step S130 is displayed on the display section 18 and also temporarily stored in the RAM 42B.

At the next step S150, determination as to whether or not measurement has ended is made by determining whether or not a non-illustrated end measurement button of the operation input section 44 has been pressed by the cyclist or whether or not the measurement duration set at step S100 has elapsed. In cases in which determination is negative at step S150, processing returns to step S110 and estimation of the aerodynamic drag information Cda expressing the aerodynamic characteristic, and the display thereof, is repeatedly executed. On the other hand, in cases in which determination is affirmative at step S150, the aerodynamic drag information Cda expressing the aerodynamic characteristic estimation result temporarily stored in the RAM 42B is written to the medium 20A at step S160, and the present processing routine is then ended.

The processing process of step S110 in FIG. 9 is an example of the functionality of the magnetic signal processing section 162 of the computation section 16 illustrated in FIG. 1. The processing process of step S120 is an example of the functionality of the pedaling power signal processing section 164 of the computation section 16 illustrated in FIG. 1. The processing process of step S130 is an example of the functionality of the aerodynamic characteristic estimation section 166 of the computation section 16 illustrated in FIG. 1.

Modified Examples

In the exemplary embodiment described above, explanation has been given regarding a case in which the velocity data expressing the velocity V of the bicycle and the acceleration data expressing the acceleration a of the bicycle are derived from the magnetic signal obtained by the rotational speed detection section 12 including the magnetic sensor 12A and the magnet 12B. Alternatively, a measurement instrument such as a pitot tube to directly measure the speed of flow of a fluid, namely a speed of airflow, may be employed instead of the rotational speed detection section 12.

In cases in which a measurement instrument such as a pitot tube to directly measure the speed of airflow is employed, Equation (8) may be expressed by Equation (16) below. Note that the acceleration a may be found by differentiating the velocity V obtained. In such cases, for example, Equation (14) may be employed.

$$CdA = \frac{2}{\rho \cdot V^2}\left(\frac{P}{V} - M \cdot a - F_{RR}\right) \quad (16)$$

Equation (16) enables the aerodynamic drag information Cda to be derived from the pedaling power P and the velocity V of the airflow.

In the exemplary embodiment described above, explanation has been given regarding a case in which the pedaling power meter 14A is employed as an example of the pedaling power detection section. Alternatively, plural sensors may be provided to function as the pedaling power detection section 14 in cases in which the pedaling power of the cyclist is detected more accurately. For example, a configuration may be adopted in which a first detection section to detect a rotation position of the crank 34, a second detection section to detect a magnitude, or the magnitude and direction, of the pedaling force acting on a pedal shaft 35, and a third detection section to detect an orientation angle (tilt angle) of the pedal 36 relative to the pedal shaft 35 are provided to detect the pedaling power at each position of the pedal 36.

A magnetic or optical rotation (for example rotational speed) detection sensor may be employed as an example of the first detection section. The first detection section may detect a rotation position of the crank 34 at the frame 38 side of a rotation shaft of the crank 34. As an example of the second detection section, a pedaling power meter mounted to the pedal shaft 35 may be employed to detect the magnitude, or the magnitude and direction, of the pedaling force acting on the pedal shaft 35 from the cyclist through the pedal 36 in a two-dimensional coordinate system including an X axis and a Z axis. Alternatively, a pressure sensor mounted to the pedal 36 may be employed instead of a pedaling power meter. As an example of the third detection section, an inertial sensor may be employed. The third detection section may be mounted to either the pedal 36 or the pedal shaft 35 to detect the orientation angle (tilt angle) of the pedal 36 relative to the pedal shaft 35.

Application Examples

Although explanation has been given in the present exemplary embodiment regarding a case in which a bicycle is traveling over horizontal ground in a wind-free environment, the present disclosure is not limited to cases in which the bicycle is traveling over horizontal ground in a wind-free environment, and may be expanded to estimate an aerodynamic characteristic for sloping ground and for wind at an angle.

Figure 12B:
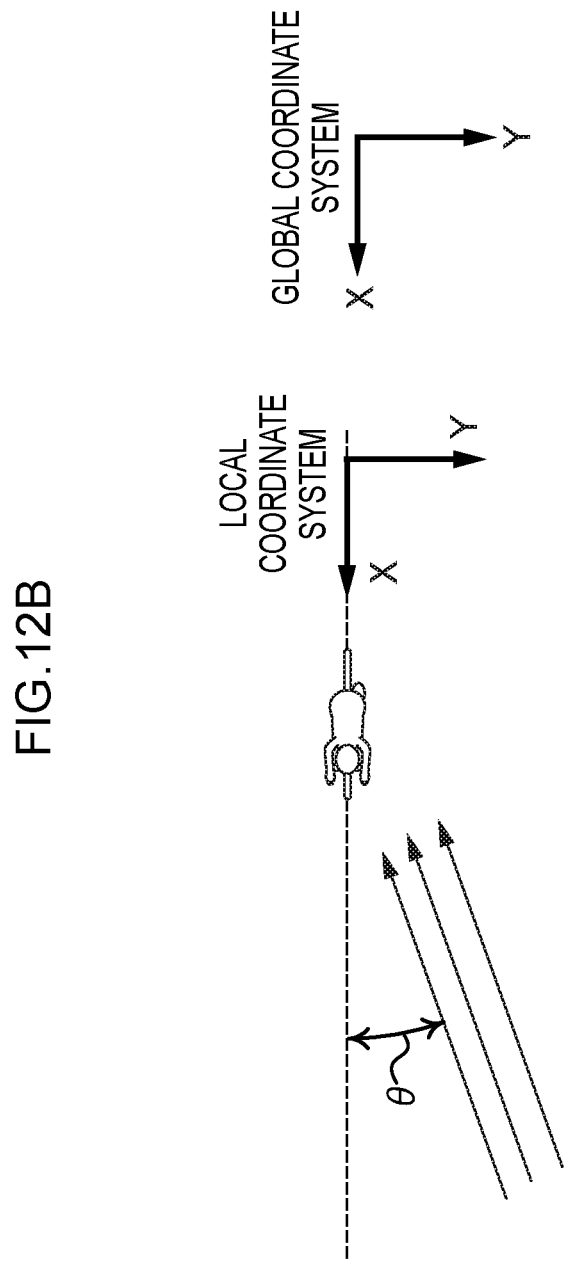
FIG. 12B is a schematic plan view illustrating the mechanics of a state of motion of a bicycle ridden by a cyclist in a case of traveling on a slope with a crosswind.

FIG. 12A and FIG. 12B are schematic diagrams based on the mechanical perspectives of a state of motion of a bicycle being ridden by a cyclist is traveling on a slope while subjected to a crosswind. FIG. 12A is a side view and FIG. 12B is a plan view. In FIG. 12A and FIG. 12B, a coordinate system for horizontal ground is illustrated as a global coordinate system and a coordinate system with respect to the road surface on the slope is illustrated as a local coordinate system.

As illustrated in FIG. 12A and FIG. 12B, Equation (3) can be expanded to Equation (17) below by applying the local coordinate system, wherein $\alpha$ is an angle formed between horizontal ground and the road surface on the slope, and $\theta$ is an angle formed between the direction of progress of the bicycle and the direction of the crosswind. Note that g is the gravity coefficient. Although the addition of a lift force term might be considered to account for a lift force in Equation (17), the effect of a lift force term is known to be very small and so such a term is omitted.

$$Ma_X = F_X - \frac{1}{2}\rho CdAV^2\cos^2(\alpha)\cos^2(\theta) - Mg\sin(\alpha) - F_{RR} \quad (17)$$

The aerodynamic characteristic on sloping ground and in wind at an angle is accordingly also able to be estimated by detecting the angle $\alpha$ and the angle $\theta$.

Other Exemplary Embodiments

Although the technology disclosed herein has been described with reference to the above exemplary embodiment, the present disclosure is not limited to the above exemplary embodiment, and various modifications may be implemented within a range not departing from the spirit of the present disclosure.

In the above exemplary embodiment explanation has been given regarding an example of application to a display device such as a display as the display section 18. However, the display section 18 may be configured by an audio output device, or by a combination of a display device and an audio output device. Specifically, an audio output device is configured to use audio to inform the cyclist of an aerodynamic characteristic by sound while operating the bicycle.

Note that exemplary embodiments of the present disclosure encompass the following aspects.

An aerodynamic characteristic estimation device of a first aspect of the present disclosure includes: a velocity detection section configured to detect at least one of a velocity of a bicycle or an acceleration of the bicycle when being pedaled by a cyclist; a pedaling power detection section configured to detect a pedaling power when being pedaled by the cyclist; and an estimation section configured to estimate aerodynamic drag information indicating an aerodynamic characteristic acting on the bicycle being ridden by the cyclist, based on a computation result of mechanical analysis according to an equation of motion established for a direction of progress of the bicycle and using the at least one of the velocity of the bicycle or the acceleration of the bicycle, as obtained from a detection result of the velocity detection section, together with the pedaling power as detected by the pedaling power detection section.

The first aspect enables aerodynamic drag to be estimated in a short period of time and at low cost without employing a large scale facility.

An aerodynamic characteristic estimation device according to a second aspect of the present disclosure is the aerodynamic characteristic estimation device of the first aspect, wherein the velocity detection section is configured to detect a rotational speed of a wheel of the bicycle and to detect the velocity of the bicycle based on plural rotational speeds of the wheel of the bicycle as detected within a predetermined specific duration of time.

The second aspect enables the velocity and acceleration to be obtained without employing a particular specialized sensor, by merely detecting rotational speeds of the wheel.

An aerodynamic characteristic estimation device according to a third aspect of the present disclosure is the aerodynamic characteristic estimation device of the first aspect or the second aspect, wherein the pedaling power detection section is configured to detect a force imparted to a pedal when being pedaled by the cyclist and to detect the pedaling power based on power imparted to a plurality of pedals as detected within a predetermined specific duration of time.

The third aspect enables the pedaling power of the cyclist to be detected without employing a particular specialized sensor, by merely detecting the forces imparted to the pedal.

An aerodynamic characteristic estimation device according to a fourth aspect of the present disclosure is the aerodynamic characteristic estimation device of any one aspect from the first aspect to the third aspect, wherein the estimation section is configured to estimate the aerodynamic drag information based on the equation:

$$CdA = 2/\rho V^2\{(P/V) - Ma - F_{RR}\}$$

wherein M is a total mass of the bicycle when being ridden by the cyclist, $\rho$ is a density of air, V is a direction of progress velocity of the bicycle, P is the pedaling power, $F_{RR}$ is a rolling resistance, and CdA is aerodynamic drag information.

The fourth aspect enables the aerodynamic drag information to be estimated with a simple calculation.

An aerodynamic characteristic estimation device according to a fifth aspect of the present disclosure is the aerodynamic characteristic estimation device of any one aspect from the first aspect to the fourth aspect, further including a display section configured to display the aerodynamic drag information estimated by the estimation section.

The fifth aspect enables the aerodynamic drag information to be checked by the cyclist in real time.

An aerodynamic characteristic estimation device according to a sixth aspect of the present disclosure is the aerodynamic characteristic estimation device of any one aspect from the first aspect to the fifth aspect, further including a detachable storage section that stores the aerodynamic drag information estimated by the estimation section.

The sixth aspect enables a user including the cyclist to check the aerodynamic drag information from when the cyclist was riding by checking at a time after the ride.

An aerodynamic characteristic estimation method according to a seventh aspect of the present disclosure includes: detecting at least one of a velocity of a bicycle or an acceleration of the bicycle when being pedaled by a cyclist; detecting a pedaling power when being pedaled by the cyclist; and estimating aerodynamic drag information indicating an aerodynamic characteristic acting on the bicycle being ridden by the cyclist, based on a computation result of mechanical analysis according to an equation of motion established for a direction of progress of the bicycle and using the at least one of the velocity of the bicycle or the acceleration of the bicycle and the pedaling power, as obtained from results of the detecting.

An eighth aspect of the plural data is a storage medium being not transitory signal and stored with a program to cause a computer to execute processing to estimate aerodynamic drag information indicating an aerodynamic characteristic acting on a bicycle while being ridden by a cyclist. The processing includes: acquiring at least one of a velocity of the bicycle or an acceleration of the bicycle when being pedaled by a cyclist; acquiring a pedaling power when being pedaled by the cyclist; and estimating aerodynamic drag information indicating an aerodynamic characteristic acting on the bicycle being ridden by the cyclist, based on a computation result of mechanical analysis according to an equation of motion established for a direction of progress of the bicycle and using the at least one of the velocity of the bicycle or the acceleration of the bicycle and the pedaling power, as obtained from results of the acquiring.

A storage medium storing a program of the present disclosure is not particularly limited, and may be a hard disk, or may be ROM. A CD-ROM, a DVD disk, a magneto-optical disk, or an IC card may also be employed therefor. Alternatively, the program may be downloaded from a server or the like connected to a network.

The disclosure of Japanese Patent Application No. 2018-237447, filed on Dec. 19, 2018, is incorporated in its entirety in the present specification by reference herein.

All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. An aerodynamic characteristic estimation device comprising:
   a velocity detection section configured to detect at least one of a velocity of a bicycle or an acceleration of the bicycle when being pedaled by a cyclist;
   a pedaling power detection section configured to detect a pedaling power when being pedaled by the cyclist; and
   an estimation section configured to estimate aerodynamic drag information indicating an aerodynamic characteristic acting on the bicycle being ridden by the cyclist, based on a computation result of mechanical analysis according to an equation of motion established for a direction of progress of the bicycle and using the at least one of the velocity of the bicycle or the acceleration of the bicycle, as obtained from a detection result of the velocity detection section, together with the pedaling power as detected by the pedaling power detection section;
   wherein the estimation section is configured to estimate the aerodynamic drag information based on the equation:

$$CdA = 2/\rho V^2 \{(P/V) - Ma - F_{RR}\}$$

wherein M is a total mass of the bicycle when being ridden by the cyclist, a is an acceleration of the bicycle, $\rho$ is a density of air, V is a direction of progress velocity of the bicycle, P is the pedaling power, $F_{RR}$ is a rolling resistance, and CdA is aerodynamic drag information.

2. The aerodynamic characteristic estimation device of claim 1, wherein:
   the velocity detection section is configured to detect a rotational speed of a wheel of the bicycle and to detect the velocity of the bicycle based on a plurality of rotational speeds of the wheel of the bicycle as detected within a predetermined specific duration of time.

3. The aerodynamic characteristic estimation device of claim 1, wherein the pedaling power detection section is configured to detect a force imparted to a pedal when being pedaled by the cyclist and to detect the pedaling power based on power imparted to a plurality of pedals as detected within a predetermined specific duration of time.

4. The aerodynamic characteristic estimation device of claim 1, further comprising a display section configured to display the aerodynamic drag information estimated by the estimation section.

5. The aerodynamic characteristic estimation device of claim 1, further comprising a detachable storage section that stores the aerodynamic drag information estimated by the estimation section.

6. An aerodynamic characteristic estimation method comprising:
   detecting at least one of a velocity of a bicycle or an acceleration of the bicycle when being pedaled by a cyclist;
   detecting a pedaling power when being pedaled by the cyclist; and
   estimating aerodynamic drag information indicating an aerodynamic characteristic acting on the bicycle being ridden by the cyclist, based on a computation result of mechanical analysis according to an equation of motion established for a direction of progress of the bicycle and using the at least one of the velocity of the bicycle or the acceleration of the bicycle and the pedaling power, as obtained from results of the detecting;
   wherein estimating the aerodynamic drag information is based on the equation:

$$CdA = 2/\rho V^2 \{(P/V) - Ma - F_{RR}\}$$

wherein M is a total mass of the bicycle when being ridden by the cyclist, a is an acceleration of the bicycle, $\rho$ is a density of air, V is a direction of progress velocity of the bicycle, P is the pedaling power, $F_{RR}$ is a rolling resistance, and CdA is aerodynamic drag information.

7. A non-transitory storage medium storing a program executable by a computer to perform processing to estimate aerodynamic drag information indicating an aerodynamic characteristic acting on a bicycle while being ridden by a cyclist, the processing comprising:
   acquiring at least one of a velocity of the bicycle or an acceleration of the bicycle when being pedaled by a cyclist;
   acquiring a pedaling power when being pedaled by the cyclist; and
   estimating aerodynamic drag information indicating an aerodynamic characteristic acting on the bicycle being ridden by the cyclist, based on a computation result of mechanical analysis according to an equation of motion established for a direction of progress of the bicycle and using the at least one of the velocity of the bicycle or the acceleration of the bicycle and the pedaling power, as obtained from results of the acquiring;

wherein estimating the aerodynamic drag information is based on the equation:

$$CdA = 2/\rho V^2 \{(P/V) - Ma - F_{RR}\}$$

wherein M is a total mass of the bicycle when being ridden by the cyclist, a is an acceleration of the bicycle, $\rho$ is a density of air, V is a direction of progress velocity of the bicycle, P is the pedaling power, $F_{RR}$ is a rolling resistance, and CdA is aerodynamic drag information.

* * * * *